US012457186B2

(12) United States Patent
Rajagopalan et al.

(10) Patent No.: US 12,457,186 B2
(45) Date of Patent: Oct. 28, 2025

(54) RESILIENT FILE TRANSFER (ResiFT) MECHANISM FOR NETWORKED COMMUNICATION

(71) Applicant: The Boeing Company, Chicago, IL (US)

(72) Inventors: Vijayasarathy Rajagopalan, Bangalore (IN); Kapaleeswaran Viswanathan, Karnataka (IN)

(73) Assignee: The Boeing Company, Arlington, VA (US)

( * ) Notice: Subject to any disclaimer, the term of this patent is extended or adjusted under 35 U.S.C. 154(b) by 1133 days.

(21) Appl. No.: 17/382,608

(22) Filed: Jul. 22, 2021

(65) Prior Publication Data

US 2024/0291888 A1 Aug. 29, 2024

Related U.S. Application Data

(60) Provisional application No. 63/059,008, filed on Jul. 30, 2020.

(51) Int. Cl.
*H04L 51/23* (2022.01)
*H04L 12/18* (2006.01)
(Continued)

(52) U.S. Cl.
CPC .......... *H04L 51/23* (2022.05); *H04L 12/1868* (2013.01); *H04L 47/283* (2013.01);
(Continued)

(58) Field of Classification Search
None
See application file for complete search history.

(56) References Cited

U.S. PATENT DOCUMENTS 6,985,454 B1 * 1/2006 Wiedeman ......... H04B 7/18589
370/316
10,050,946 B2 8/2018 Templin et al.
(Continued)

FOREIGN PATENT DOCUMENTS

EP 0948168 A1 * 10/1999
WO WO-2013182122 A1 * 12/2013 ........... H04L 47/283

OTHER PUBLICATIONS

Nyamekye, Kofi, "C2 in Underdeveloped, Degraded and Denied Operational Environments", 18th ICCRTS, 2013.
(Continued)

*Primary Examiner* — Lance Leonard Barry
(74) *Attorney, Agent, or Firm* — Harrity & Harrity, LLP

(57) ABSTRACT

A method for resilient file transfer comprises transmitting, by a source, a fragment of a file to a destination. The method further comprises transmitting, by the destination, an acknowledgement to the source, when the destination receives the fragment. Also, the method comprises calculating a current delay measurement ($\delta$), which is a difference of a time the fragment is transmitted from the source and a time the acknowledgement is received by the source, when the source receives the acknowledgement. Additionally, the method comprises calculating a current delay estimation ($\delta_e^{n+1}$), which is a sum of a previous delay estimation ($\delta_e^n$) weighted by a variable alpha ($\alpha$) and the current delay measurement ($\delta$) weighted by a variable beta ($\beta$), when the source receives the acknowledgement. Further, the method comprises determining whether a subsequent fragment transmitted should be retransmitted by the source to the destination by using the current delay estimation ($\delta_e^{n+1}$).

20 Claims, 11 Drawing Sheets

(51) Int. Cl.
  *H04L 47/283* (2022.01)
  *H04L 67/06* (2022.01)
  *H04L 67/1074* (2022.01)

(52) U.S. Cl.
  CPC .......... *H04L 67/06* (2013.01); *H04L 67/1074* (2013.01); *H04L 67/108* (2013.01)

(56) References Cited

U.S. PATENT DOCUMENTS

| | | | | |
|---|---|---|---|---|
| 2006/0262738 A1* | 11/2006 | Fernandes | ............. | H04L 69/163 370/395.2 |
| 2013/0272286 A1* | 10/2013 | Sharma | ................ | H04W 84/18 370/338 |
| 2015/0269445 A1* | 9/2015 | Ueda | ...................... | G06V 10/44 348/118 |
| 2015/0326633 A1* | 11/2015 | Chang | .................... | H04L 65/60 709/219 |
| 2018/0027099 A1* | 1/2018 | Dajani | ................... | H04L 69/16 709/217 |
| 2018/0091765 A1* | 3/2018 | Mobasher | ............. | H04L 1/0017 |
| 2020/0064826 A1* | 2/2020 | Engle | ..................... | G05D 1/249 |

OTHER PUBLICATIONS

Scott, Keith, et al., "Robust Communications for Disconnected, Intermittent, Low-Bandwith (DIL) Environments," 2011 Military Communications Conference, pp. 1009-1014.

"IBR-DTN—A modular and lightweight implementation of the bundle protocol," Web Page <https://github.com>, 3 pages, retrieved from the Internet <https://github.com/ibrdtn/ibrdtn> on Oct. 28, 2021.

"Interplanetary Overlay Network (ION-DTN)," Web Page < https://sourceforge.net>, 3 pages, retrieved from the Internet <https://sourceforge.net/p/ion-dtn/wiki/Home/> on Oct. 28, 2021.

"Wave Glider platform Liquid Robotics," Web Page < https://www.liquid-robotics.com>, 4 pages, retrieved from the Internet <https://www.liquid-robotics.com/wave-glider/overview/> on Oct. 28, 2021.

* cited by examiner

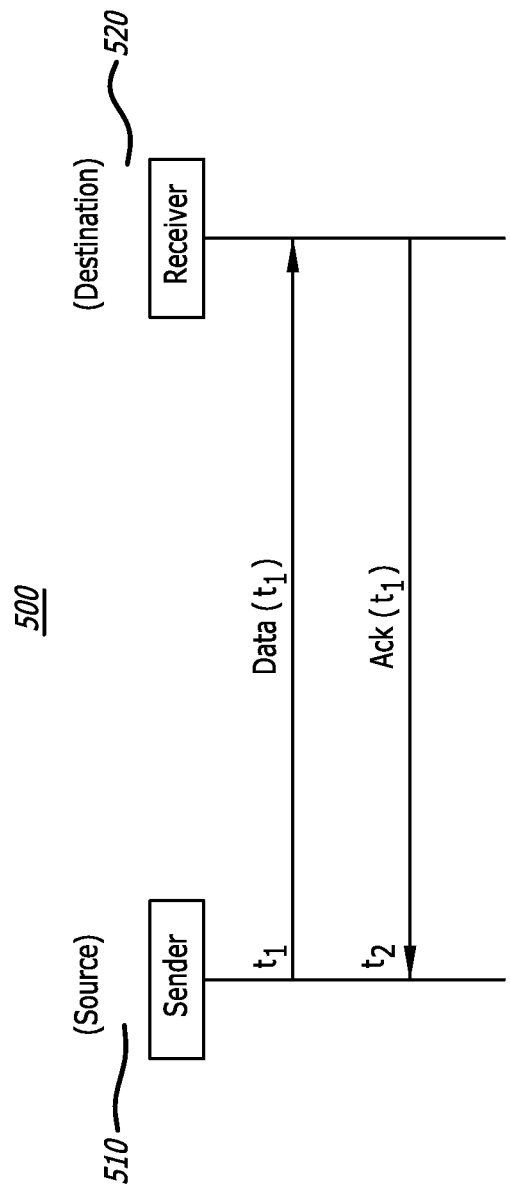

Algorithm Pseudocode
FIG. 6
600

Initialize(measureInit, alphaInit, betaInit, gammaInit) 610
  delta_e = measureInit
  delta_max = measureInit * maxPolicy
  alpha = alphaInit /*typically 0.8*/
  beta = betaInit /*typically 0.2*/
  gamma = gammaInit /*typically 2*/

UpdateForecast(measure) 620
  delta_e = (alpha * delta_e) + (beta * measure)

RecordTimeout() 630
  deltaTemp = (alpha + 2*beta) * delta_e
  If (deltaTemp > delta_max)
    delta_e = delta_max
  Else
    delta_e = deltaTemp isTimeout(sendTime) 640
  if ((delta_e * gamma) < (currentTime − sendTime))
    return TRUE
  return FALSE measureInit: Initial value of timeout − "typical" round-trip delay value for data/control round trip communication
maxPolicy: Maximum factor (of measureInit) that can be tolerated by the system
gammaInit: Cushion factor for timeout computation
Delta_e: Current value of timeout (data/control)
Delta_max: Maximum permissible timeout

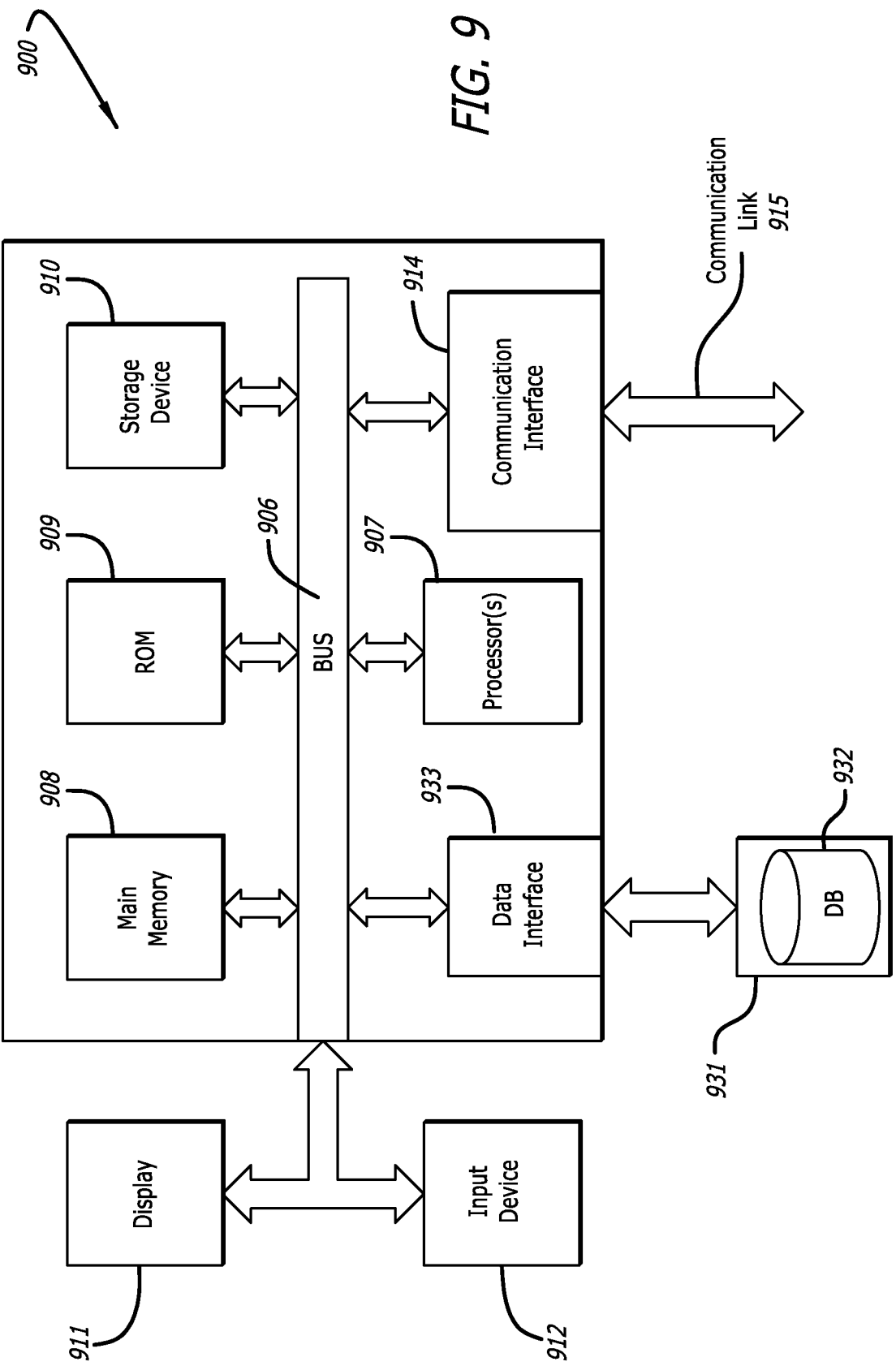

RESILIENT FILE TRANSFER (ResiFT) MECHANISM FOR NETWORKED COMMUNICATION

CROSS REFERENCE TO RELATED APPLICATION

The present application claims priority to U.S. Provisional patent application Ser. No. 63/059,008, filed Jul. 30, 2020, which is hereby incorporated by reference in its entirety.

FIELD

The present disclosure relates to file transfer mechanisms. In particular, the present disclosure relates to resilient file transfer (ResiFT) mechanisms for sea-air-space-shore networked communication.

BACKGROUND

Currently, sea-to-shore communication is characterized by lack of permanent end-to-end connectivity; frequently disrupted communications, which give rise to disconnected networks; and heterogeneous transport mechanisms, such as Transmission Control Protocol (TCP), User Datagram Protocol (UDP), Licklider Transmission Protocol (LTP). Such networks use peer-to-peer communication opportunities and store-carry-forward message delivery, which requires the intermediate peer to receive and store outbound messages for longer period of times (which is not the case in internet protocol (IP) networks, where an outbound message is immediately dropped, if the peer is not reachable).

In light of the foregoing, there is a need for an improved design for a resilient file transfer mechanism for sea-to-shore communication (e.g., sea-air-space-shore networked communication).

SUMMARY

The present disclosure relates to a method, system, and apparatus for a resilient file transfer mechanism for networked communication (e.g., sea-air-space-shore networked communication). In one or more embodiments, a method for resilient file transfer comprises transmitting, by a source, a fragment of a file to a destination. The method further comprises transmitting, by the destination, an acknowledgement to the source, when the destination receives the fragment. Also, the method comprises calculating, by at least one processor, a current delay measurement ($\delta$), which is a difference of a time the fragment is transmitted from the source and a time the acknowledgement is received by the source, when the source receives the acknowledgement. In addition, the method comprises calculating, by at least one processor, a current delay estimation ($\delta_e^{n+1}$), which is a sum of a previous delay estimation ($\delta_e^n$) weighted by a variable alpha ($\alpha$) and the current delay measurement ($\delta$) weighted by a variable beta ($\beta$), when the source receives the acknowledgement. Further, the method comprises determining, by at least one processor, whether a subsequent fragment transmitted should be retransmitted by the source to the destination by using the current delay estimation ($\delta_e^{n+1}$).

In one or more embodiments, the method further comprises transmitting, by the source, the subsequent fragment to the destination. Further, the method comprises calculating, by at least one processor, a time difference ($\Delta T$), which is equal to a difference of a time the subsequent fragment is transmitted from the source and a current time. Also, the method comprises retransmitting, by the source, the subsequent fragment to the destination, when the time difference ($\Delta T$) is greater than the current delay estimation ($\delta_e^{n+1}$) multiplied by a variable gamma ($\gamma$).

In at least one embodiment, the method further comprises setting, by at least one processor, the current delay measurement ($\delta$) to equal the current delay estimation ($\delta_e^{n+1}$) multiplied by the variable gamma ($\gamma$), when the time difference ($\Delta T$) is greater than the current delay estimation ($\delta_e^{n+1}$) multiplied by the variable gamma ($\gamma$). Also, the method comprises recalculating, by at least one processor, the current delay estimation ($\delta_e^{n+1}$) using the current delay measurement ($\delta$) equal to the current delay estimation ($\delta_e^{n+1}$) multiplied by the variable gamma ($\gamma$), when the time difference ($\Delta T$) is greater than the current delay estimation ($\delta_e^{n+1}$) multiplied by the variable gamma ($\gamma$).

In one or more embodiments, the method further comprises calculating, by at least one processor, a maximum delay ($\delta_{max}$), which is equal to an initial delay estimation multiplied by a maximum policy value. Further, the method comprises setting, by at least one processor, the current delay estimation ($\delta_e^{n+1}$) to equal the maximum delay ($\delta_{max}$), when the current delay estimation ($\delta_e^{n+1}$) is greater than the maximum delay ($\delta_{max}$).

In at least one embodiment, a sum of the variable alpha ($\alpha$) and the variable beta ($\beta$) is equal to one (1). In one or more embodiments, at least one processor is located one of at the source or remote from the source. In some embodiments, a source fragment communicator of the source transmits the fragment.

In one or more embodiments, the method further comprises receiving, by the destination, the fragment. In some embodiments, a destination fragment communicator of the destination receives the fragment.

In at least one embodiment, a vehicle or a terrestrial node comprises the source or the destination. In one or more embodiments, the vehicle is an airborne vehicle, a marine vehicle, a terrestrial vehicle, or a space vehicle. In some embodiments, the vehicle is an autonomous vehicle.

In one or more embodiments, the fragment is transmitted by the source to the destination via a delay-tolerant and reliable file transfer (DR-FT) layer in a protocol stack. In at least one embodiment, the acknowledgement is transmitted by the destination to the source via a delay-tolerant and reliable file transfer (DR-FT) layer in a protocol stack. In some embodiments, the DR-FT layer is adjacent a delay tolerant networking (DTN) layer in the protocol stack.

In at least one embodiment, a system for resilient file transfer comprises a source configured to transmit a fragment of a file to a destination. The system further comprises the destination configured to transmit an acknowledgement to the source, when the destination receives the fragment. In addition, the system comprises at least one processor configured to: calculate a current delay measurement ($\delta$), which is a difference of a time the fragment is transmitted from the source and a time the acknowledgement is received by the source, when the source receives the acknowledgement; calculate a current delay estimation ($\delta_e^{n+1}$), which is a sum of a previous delay estimation ($\delta_e^n$) weighted by a variable alpha ($\alpha$) and the current delay measurement ($\delta$) weighted by a variable beta ($\beta$), when the source receives the acknowledgement; and determine whether a subsequent fragment transmitted should be retransmitted by the source to the destination by using the current delay estimation ($\delta_e^{n+1}$).

In one or more embodiments, a method for resilient file transfer (ResiFT) comprises identifying, by at least one processor associated with a source, a file to be transmitted from the source to a destination. The method further comprises determining, by at least one processor running a delay-tolerant and reliable file transfer (DR-FT) application, whether the source has a security certificate for the destination. Also, the method comprises obtaining, by at least one processor running a public key distribution network (PKDN) application, the security certificate for the destination from the destination, when at least one processor determines that the source does not have the security certificate for the destination. In addition, the method comprises encrypting and signing, by at least one processor, the file to generate a signed encrypted file. Additionally, the method comprises stripping, by at least one processor running another DR-FT application, the signed encrypted file to generate a plurality of fragments. Further, the method comprises transmitting, by at least one processor running a delay tolerant networking (DTN) application, the fragments from the source to the destination.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 5 is a diagram illustrating the determination of the round trip time (RTT) for the disclosed system for resilient file transfer for networked communication, in accordance with at least one embodiment of the present disclosure.

FIG. 6 is a diagram showing exemplary algorithm pseudocode for the disclosed method for resilient file transfer for networked communication, in accordance with at least one embodiment of the present disclosure.

Figure 7A:
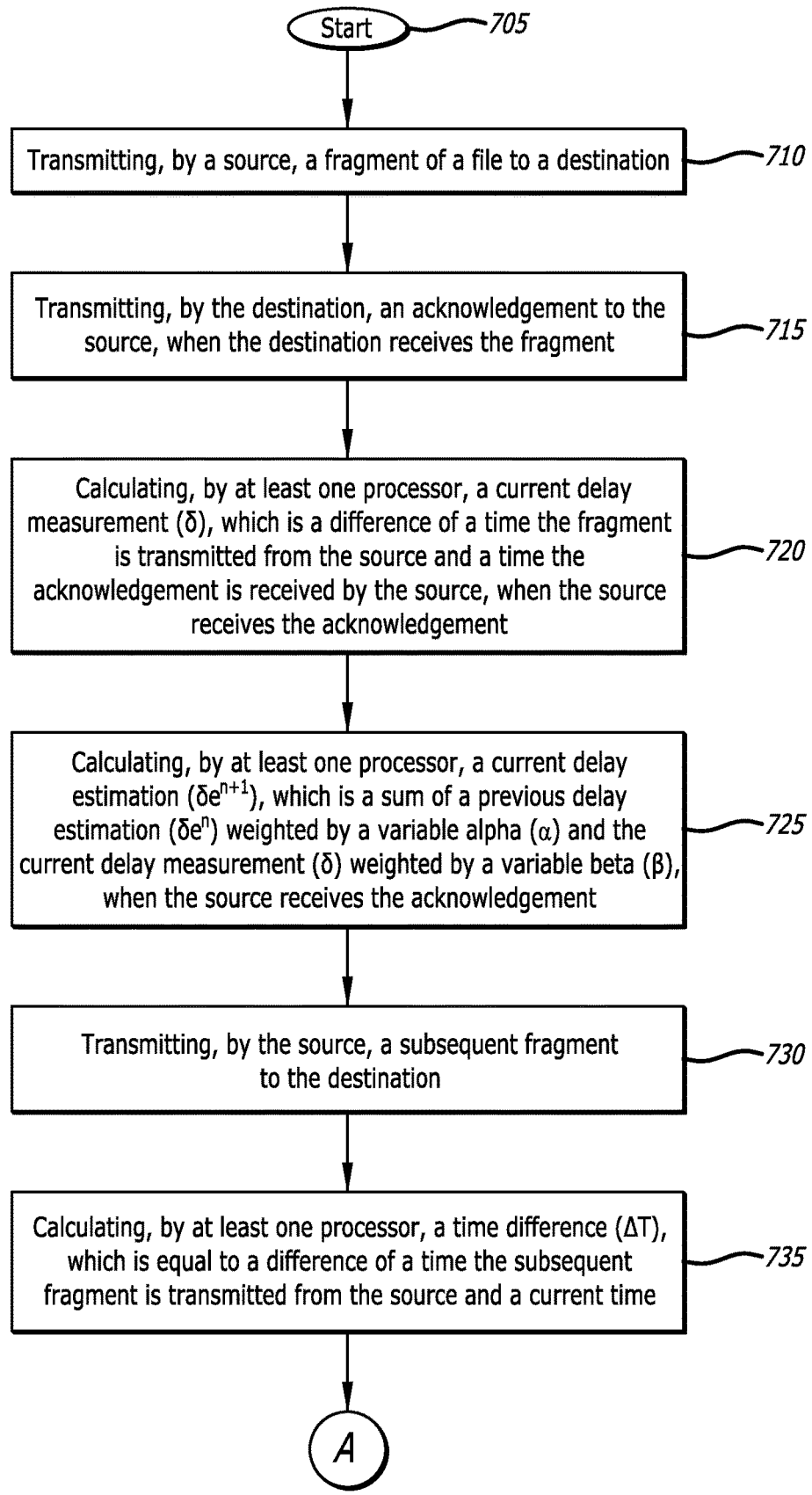
Figure 7B:
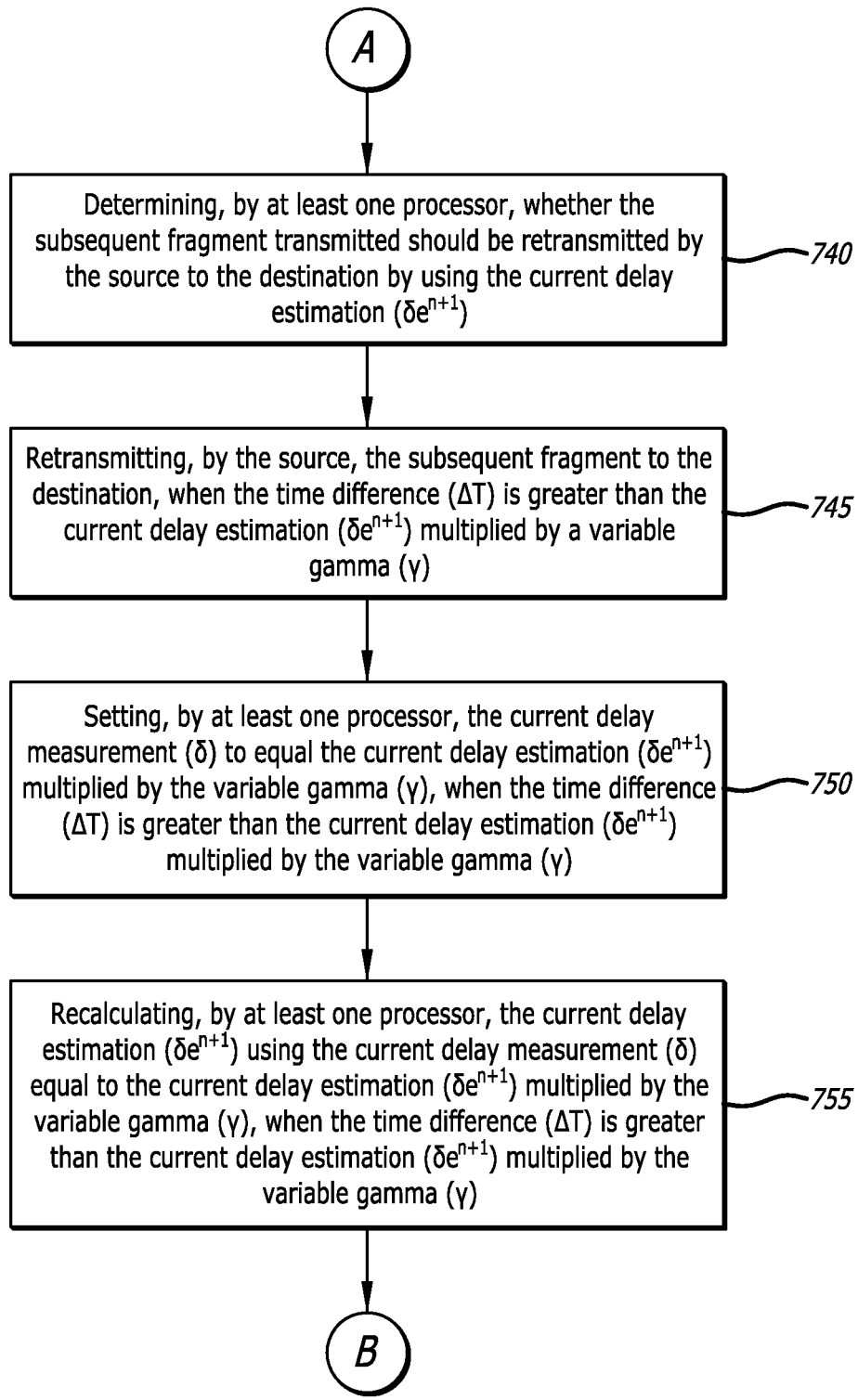
Figure 7C:
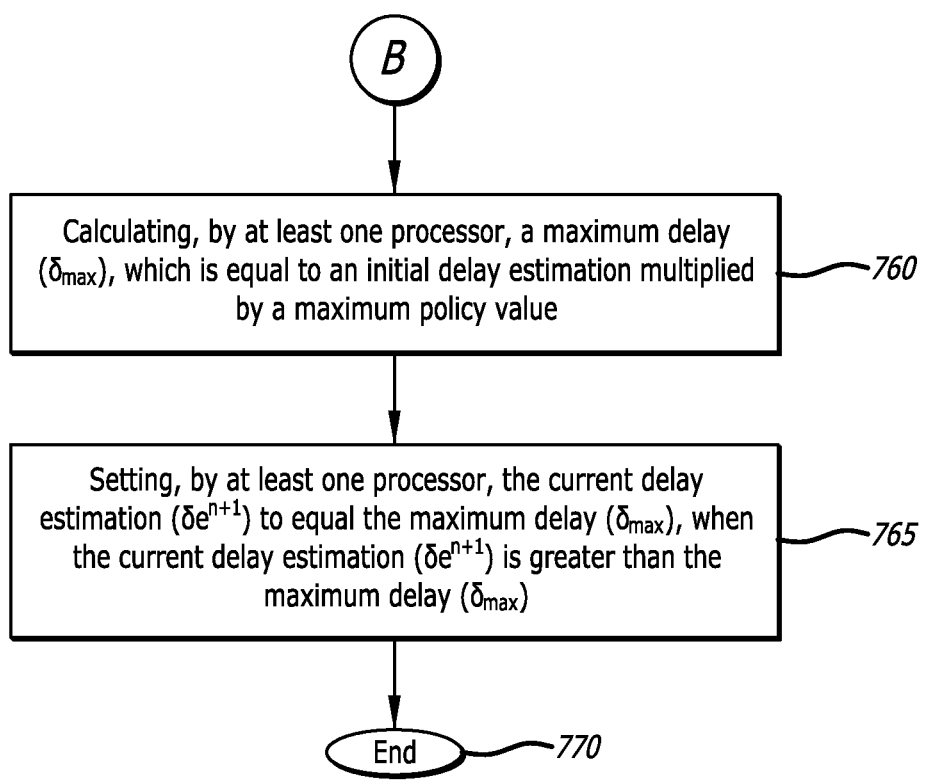

FIGS. 7A, 7B, and 7C together are a flow chart showing the disclosed method for resilient file transfer for networked communication, in accordance with at least one embodiment of the present disclosure.

Figure 8:
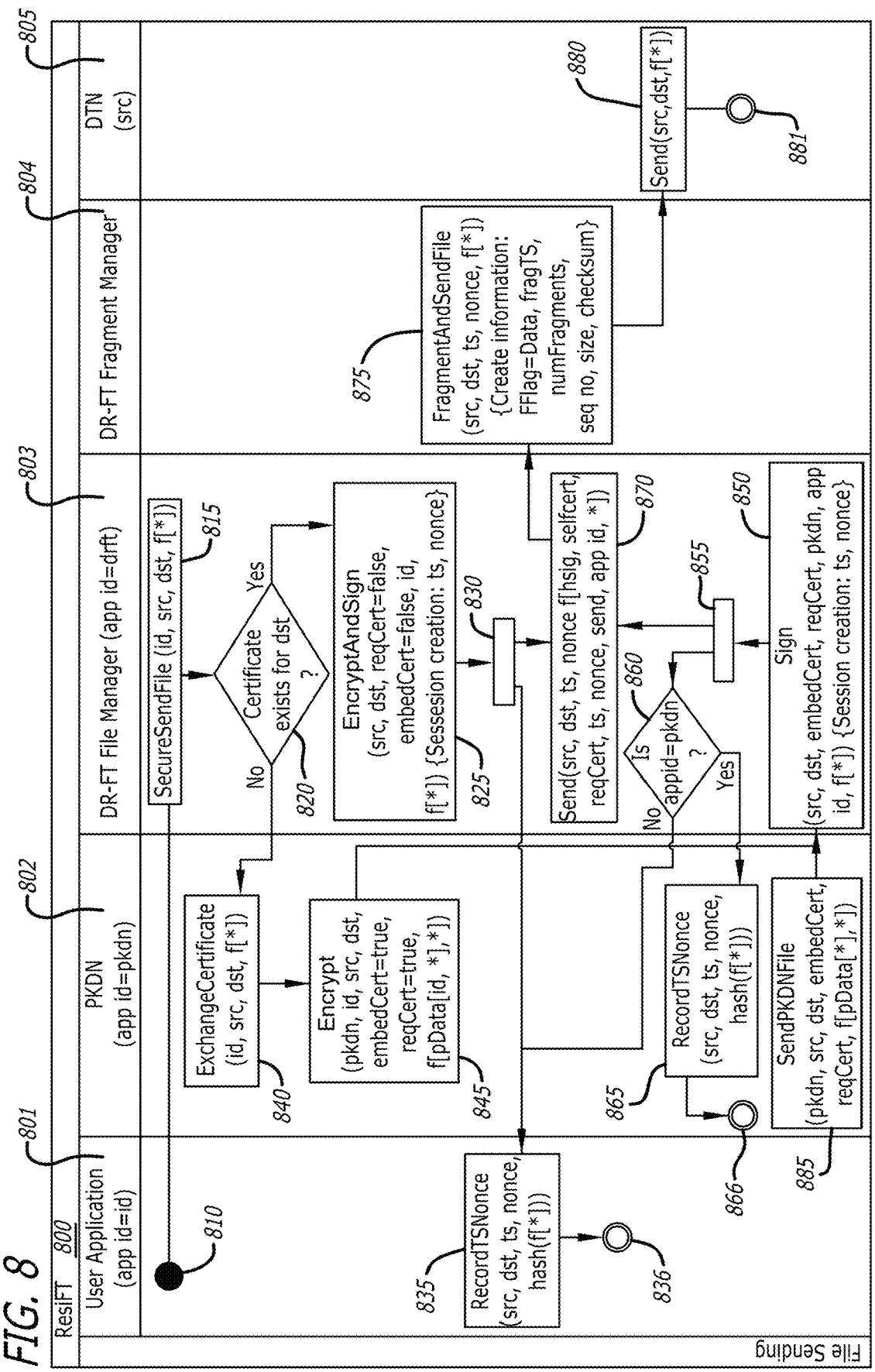

FIG. 8 is a diagram showing a sequence diagram of the component interactions when a file is sent for the disclosed method for resilient file transfer for networked communication, in accordance with at least one embodiment of the present disclosure.

FIG. 9 illustrates a block diagram of an illustrative computing system suitable for implementing an embodiment of the present disclosure, in accordance with at least one embodiment of the present disclosure.

DESCRIPTION

The methods and apparatus disclosed herein provide an operative system for a resilient file transfer mechanism for networked communication (e.g., a sea-air-space-shore networked communication). In particular, the system for the present disclose provides Resilient File Transfer (ResiFT), which is a reliable, secure, and disruption-tolerant networked communication system. The disclosed ResiFT system provides reliable and secure message delivery services for arbitrary applications using an unreliable underlying communication layer that experiences prolonged periods of disruptions and long communication delays. The disclosed ResiFT system can be used for sea-air-space-shore (e.g., sea-to-shore) networked communications.

As previously mentioned above, sea-to-shore communication is characterized by lack of permanent end-to-end connectivity; frequently disrupted communications, which give rise to disconnected networks; and heterogeneous transport mechanisms, such as Transmission Control Protocol (TCP), User Datagram Protocol (UDP), Licklider Transmission Protocol (LTP). Such networks use peer-to-peer communication opportunities and store-carry-forward message delivery, which requires the intermediate peer to receive and store outbound messages for longer period of times (which is not the case in internet protocol (IP) networks, where an outbound message is immediately dropped, if the peer is not reachable).

Common internet applications, such as the Simple Mail Transfer Protocol (SMTP) and file transfer protocol (FTP), operate on top of standard transport protocols, such as TCP, which provides acknowledgements for receipt of file by the receiver to the sender. However, these applications cannot function properly when there are frequent disruptions and long delays in their networked communications. The maximum end-to-end delay that TCP can tolerate is one (1) second, and TCP requires immediate message delivery feedbacks from the receiver. Therefore, TCP does not tolerate any communication disruption. Certificate revocation mechanisms for current PKI work over TCP and, therefore, these mechanisms do not tolerate communication disruption. Certificate revocation is a core mechanism of any PKI. Delay Tolerant Networking (DTN) is an overlay protocol designed to work in networks characterized by high delays and frequent disruptions. DTN makes use of opportunistic peer-to-peer communications to transfer files. However, DTN (or existing DTN based message transfer mechanisms) do not provide reliable message delivery semantics.

The reliability mechanisms of the disclosed ResiFT system provide feedbacks to the sender (e.g., the source) about the successful receipt of messages (e.g., a file), or their parts (e.g., fragments of the file), by a specific receiver (e.g., the destination). If the sender does not receive feedbacks for a specified period of time, which is referred to as a "timeout period", the sender needs to retransmit parts (e.g., fragments) of the message (e.g., a file) for which feedback was not received. The disclosed ResiFT system includes security mechanisms that ensure that messages sent on the network are encrypted under the public key of the receiver, which is certified in a Public Key Infrastructure (PKI), and ensure that PKI certificate distribution and revocation messages are realized in a reliable manner.

The disclosed ResiFT system as a number of advantageous features. A first advantageous feature is that the ResiFT system guarantees end-to-end reliable message delivery service for its applications, even when only parts of the message were transferred successfully. A second advantageous feature is that the ResiFT system automatically retransmits those parts of the message that were not acknowledged by the receiver within a calculated period of time (e.g., a timeout period). Retransmission of only parts of the file ensures that the entire file need not be retransmitted. A third advantageous feature is that the ResiFT system maintains and dynamically computes the timeout period at the sender for every receiver using a history of the time-delays between the transmission of a message part (e.g., a fragment of a file) and the receiving of a corresponding acknowledgment from the receiver indicating receipt of the message part. The ResiFT system uses DTN as the underlying communication layer and, therefore, the ResiFT system can effectively utilize network information available in DTN bundles for this purpose. The disclosed ResiFT system can also work over other communication protocols like the email protocol. A fourth advantageous feature is that the ResiFT system computes a timeout period between a sender and a receiver on-the-fly. This just-in-time approach ensures that the ResiFT system retransmissions (e.g., retransmissions of fragments) are protected from abrupt changes in communication delays between the sender and the receiver. A fifth advantageous feature is that the ResiFT system uses a Public Key Distribution Network (PKDN) for key management. PKDN provides for eventual consistency of keys and key metadata, while being network partition-tolerant. A sixth advantageous feature is that the ResiFT system provides an efficient algorithm to determine when to retransmit message parts (e.g., fragments).

A seventh advantageous feature is that the ResiFT system allows for sea-air-space-shore communication capabilities for autonomous vehicles. An eighth advantageous feature is that the ResiFT system allows for a reduction in the cost of communication, and makes communication quicker by using peer-to-peer communication opportunities. And, a ninth advantageous feature is that the ResiFT system allows for improved bandwidth and disk space utilization for autonomous vehicles by providing end-to-end reliability services.

The disclosed ResiFT system utilizes DTN to provide a disruption-and-delay-tolerant, end-to-end reliable and secure file transfer mechanism. The disclosed ResiFT mechanism provides reliable and secure services for multiple arbitrary applications running on top of the ResiFT DTN transport layers. The ResiFT mechanism retransmits only parts of the file which have not been received at the receiver, thereby saving network bandwidth. In addition, the ResiFT mechanism efficiently determines when to retransmit file fragments, given arbitrarily high network delays and high unpredictability in end-to-end delay between endpoints.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to communication networks, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

Figure 1:
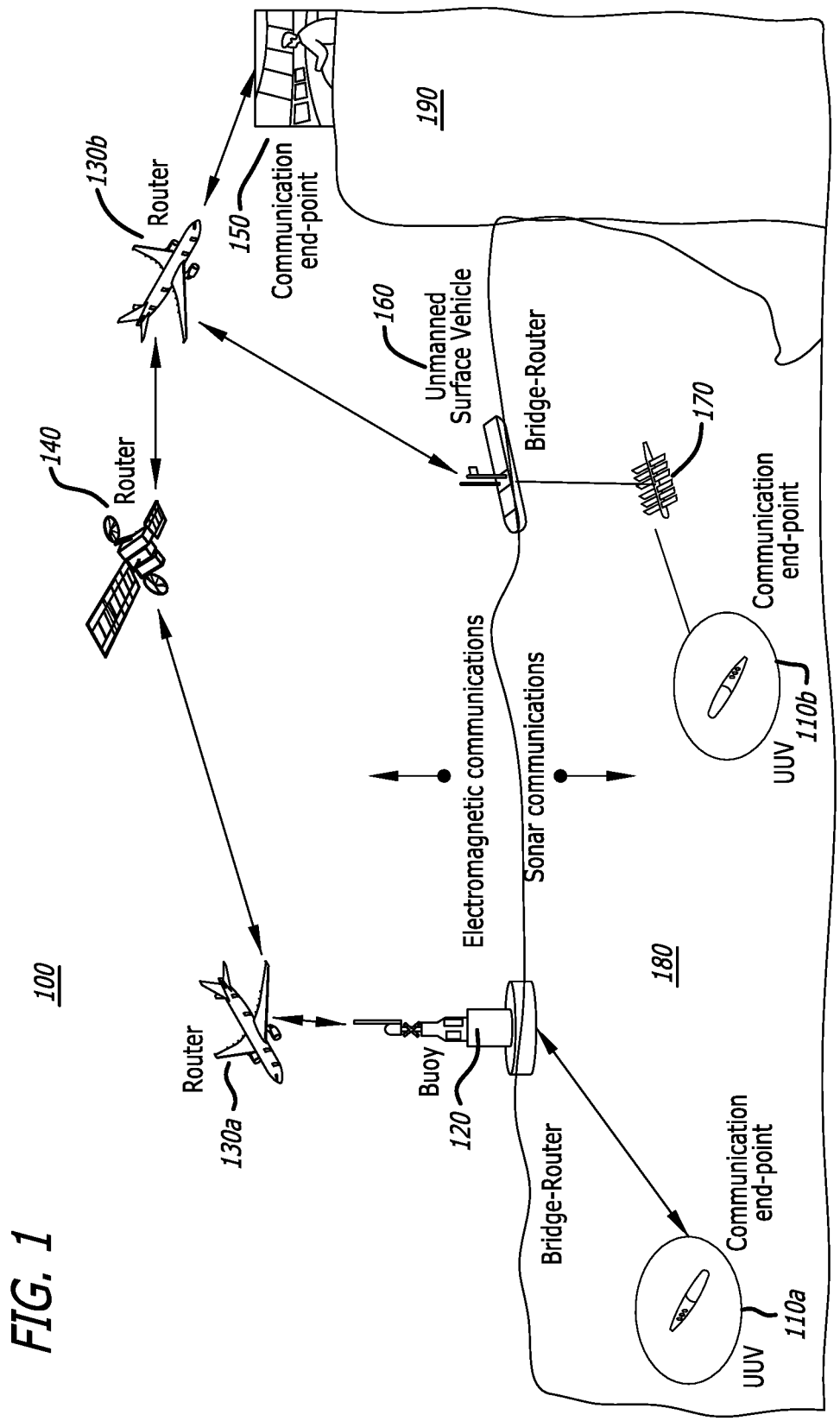
FIG. 1 is a diagram showing the disclosed system for resilient file transfer for networked communication, in accordance with at least one embodiment of the present disclosure.

FIG. 1 is a diagram showing the disclosed system 100 for resilient file transfer for networked communication, in accordance with at least one embodiment of the present disclosure. In this figure, the system 100 utilizes a plurality of vehicles along with stationary entities to provide for sea-air-space-shore communications. The disclosed system 100 for resilient file transfer for networked communication allows for reliable and secure message delivery services for sea-air-space-shore communications, which are typically characterized by lack of permanent end-to-end connectivity and frequently disrupted communications.

In this figure, the system 100 is shown to employ a plurality of vehicles. In particular, the system 100 is shown to include, in the water 180, two unmanned underwater vehicles (UUVs) 110a, 110b, and a marine unmanned surface vehicle 160. In addition, the system 100 is shown to include, in the air, the two airplanes 130a, 130b, and a satellite 140.

It should be noted that in other embodiments, the disclosed system 100 may employ more or less vehicles than as shown in FIG. 1. Various types of vehicles that the disclosed system 100 may employ include, but are not limited to, terrestrial vehicles (e.g., trucks, trains, and/or automobiles), marine vehicles (e.g., boats, ships, and/or submarines), airborne vehicles (e.g., aircraft), and/or space vehicles (e.g., satellites). In addition, it should be noted that any of the vehicles employed by the disclosed system 100 may be autonomous vehicles.

In addition, in FIG. 1, the system 100 is also shown to employ a plurality of stationary entities. Specifically, these stationary entities include, in the water 180, a buoy 120 and an underwater relay 170; and, on land 190, a ground station (e.g., an operation control center and/or a gateway) 150, which is operating as a terrestrial node. It should be noted that in other embodiments, the disclosed system 100 may employ more or less stationary entities than as shown in FIG. 1. Various different types of stationary entities that may be employed by the disclosed system 100 include, but are not limited to, buoys, underwater relays, terrestrial nodes, routers, and/or cellular towers.

During operation of the disclosed system 100, each of the vehicles and stationary entities of the disclosed system 100 may operate as (or comprise) a source (i.e. a sender) (e.g., refer to 410 of FIG. 4) and/or operate as (or comprise) a destination (i.e. a receiver) (e.g., refer to 420 of FIG. 4) of communications. For example, in one or more embodiments of the disclosed system 100, the UUVs 110a, 110b, and the ground station 150 may each operate as a communication end-point (i.e. a source and/or a destination).

As an example, during operation of the disclosed system 100, UUV 110a (operating as a source) may desire to transmit a communications signal to the ground station 150 (operating as a destination). At the start of the transmission, UUV 110a will transmit a communications signal (e.g., via underwater sonar communications) to the buoy 120, which is operating as a bridge router to bridge the underwater communications to the airborne communications. The buoy 120 will then transmit the communications signal (e.g., via wireless electromagnetic communications, such as radio frequency (RF) communications) to the ground station 150 via the airplanes 130a, 130b, and satellite 140, which are operating as routers.

As another example, during operation of the disclosed system 100, UUV 110b (operating as a source) may desire to transmit a communications signal to the ground station 150 (operating as a destination). At the start of the transmission, UUV 110b will transmit a communications signal (e.g., via underwater sonar communications) via the underwater router 170 to the marine unmanned surface vehicle 160, which is operating as a bridge router to bridge the underwater communications to the airborne communications. The marine unmanned surface vehicle 160 will then transmit the communications signal (e.g., via wireless electromagnetic communications, such as RF communications) to the ground station 150 via the airplane 130b, which is operating as a router.

Figure 2:
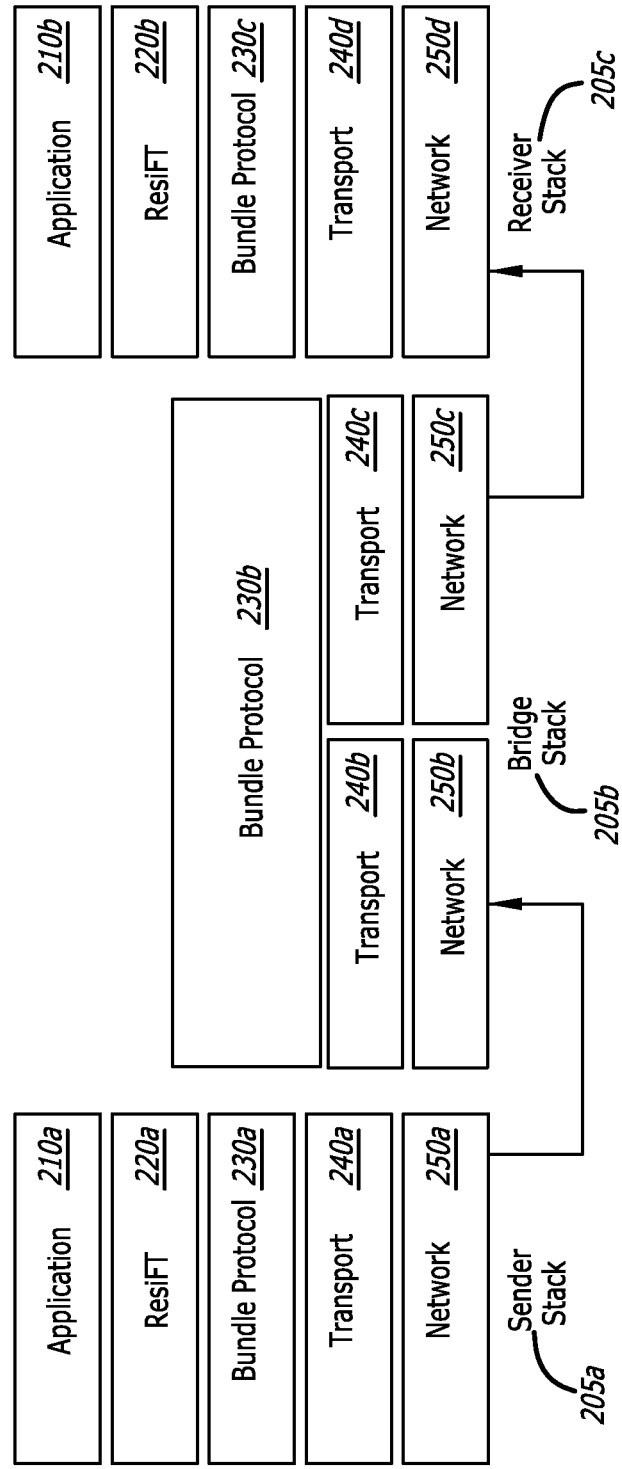
FIG. 2 is a diagram showing the high level architecture employed by the disclosed system for resilient file transfer for networked communication, in accordance with at least one embodiment of the present disclosure.

FIG. 2 is a diagram showing the high level architecture (protocol stack) 200 employed by the disclosed system for resilient file transfer for networked communication, in accordance with at least one embodiment of the present disclosure. In this figure, the high level architecture 200 is shown to comprise three main protocol stacks, which are the sender (source) protocol stack 205a, the bridge protocol stack 205b, and the receiver (destination) protocol stack 205c.

In this figure, the sender protocol stack 205a is shown to comprise an application layer 210a, a ResiFT layer 220a, a bundle protocol layer 230a, a transport layer 240a, and a network layer 250a. Similarly, the receiver protocol stack 205c, is shown to comprise an application layer 210b, a ResiFT layer 220b, a bundle protocol layer 230c, a transport layer 240d, and a network layer 250d. And, the bridge protocol stack 205b is shown to include a bundle protocol layer 230b, two transport layers 240b, 240c, and two network layers 250b, 250c.

The bundle protocol layers 230a, 230b, 230c of the protocol stacks 205a, 205b, 205c comprise delay tolerant networking (DTN). These bundle protocol layers 230a, 230b, 230c (comprising DTN's bundle protocol) provide a platform for communication for the ResiFT mechanism. ResiFT runs (in the ResiFT layers 220a, 220b) on top of DTN as a daemon providing end-to-end reliability and key security. Applications (in the application layers 210a, 210b) connect to ResiFT, which provides the applications end-to-end reliable services. ResiFT uses underlying DTN functionality for opportunistic networking. The bundle protocol layers 230a, 230b, 230c (which comprise DTN) are located on top of the transport layers 240a, 240b, 240c, 240d.

Figure 3:
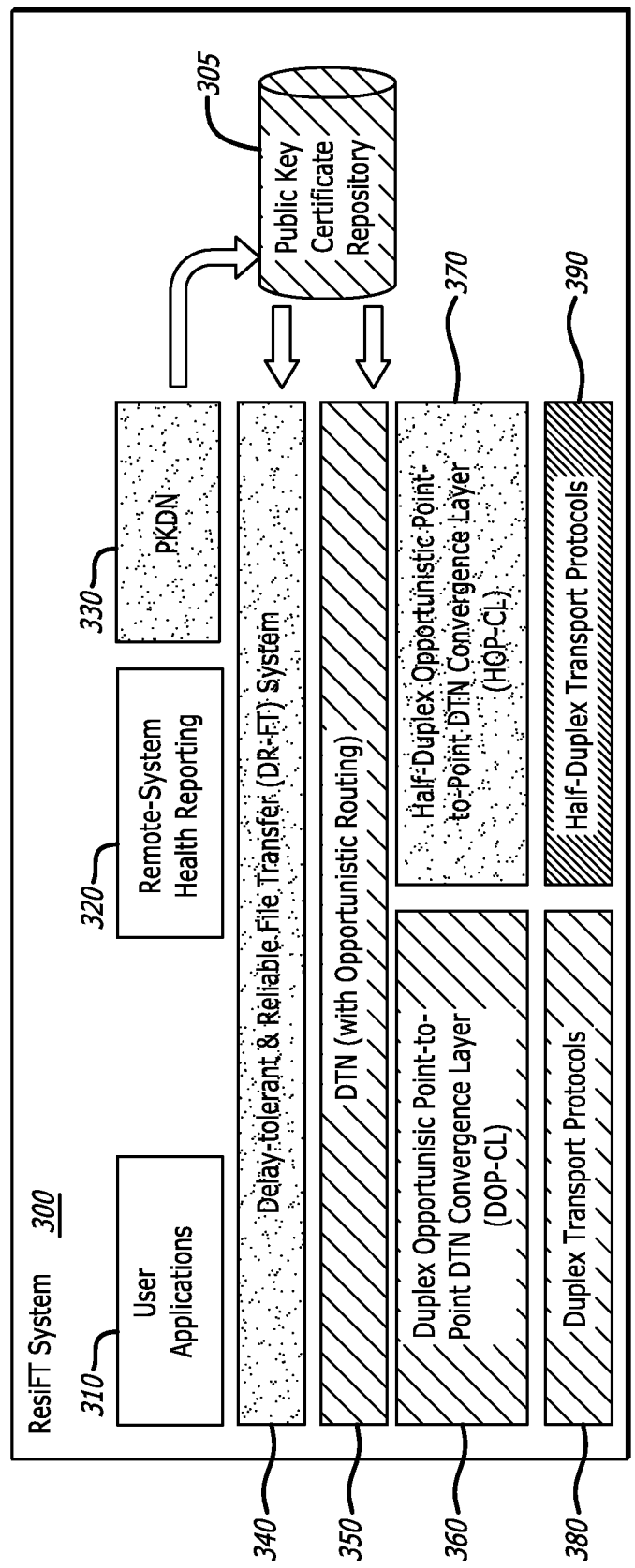
FIG. 3 is a diagram showing details of the high level architecture of FIG. 2, in accordance with at least one embodiment of the present disclosure.

FIG. 3 is a diagram (protocol stack) 300 showing details of the high level architecture 200 of FIG. 2, in accordance with at least one embodiment of the present disclosure. In particular, this figure shows the details of the architecture for the ResiFT layers 220a, 220b of the sender protocol stack 205a and the receiver protocol stack 205c of FIG. 2. In addition, this figure shows the details of the architecture for the bundle protocol layers 230a, 230b, 230c of the sender protocol stack 205a, the bridge protocol stack 205b, and the receiver protocol stack 205c of FIG. 2.

The diagram 300 of FIG. 3 is shown to comprise a user applications layer 310, a remote-system health reporting layer 320, and a Public Key Distribution Network (PKDN) layer 330, which provides end-to-end reliability for communications. These three layers are located on top of a delay-tolerant and reliable file transfer (DR-FT) system layer 340, which provides for secure key management.

The DR-FT system layer 340 of FIG. 3 is located on top of a DTN layer 350. The DTN layer 350 is located on top of both a duplex opportunistic point-to-point DTN convergence layer (DOP-CL) 360 and a half-duplex opportunistic point-to-point DTN convergence layer (HOP-CL) 370. The DOP-CL 360 is located on top of a duplex transport protocols layer 380, and the HOP-CL 370 is located on top of a half-duplex transport protocols 390 layer.

It should be noted that the application layers 210a, 210b of FIG. 2 correspond to the user application layer 310 of FIG. 3. The ResiFT layers 220a, 220b of FIG. 2 comprise the PKDN layer 330 (which provides end-to-end reliability) and the DR-FT system layer 340 (which provides for secure key management) of FIG. 3. As such, the ResiFT mechanism provides for the combination of end-to-end reliability (provided by DR-FT) and secure key management (provided by PKDN) for communications.

The bundle protocol layers 230a, 230b, 230c of FIG. 2 comprise the DTN layer 350, the DOP-CL layer 360, and the HOP-CL layer 370 of FIG. 3. And, the transport layers 240a, 240b, 240c, 240d of FIG. 2 comprise the duplex transport protocols layer 380 and the half-duplex transport protocols layer 390.

During operation of the disclosed system, the PKDN layer 330 deposits (stores) public keys in the public key certificate repository 305. The public key certificate repository 305 distributes the public keys to the DR-FT system layer 340 and the DTN layer 305.

Figure 4:
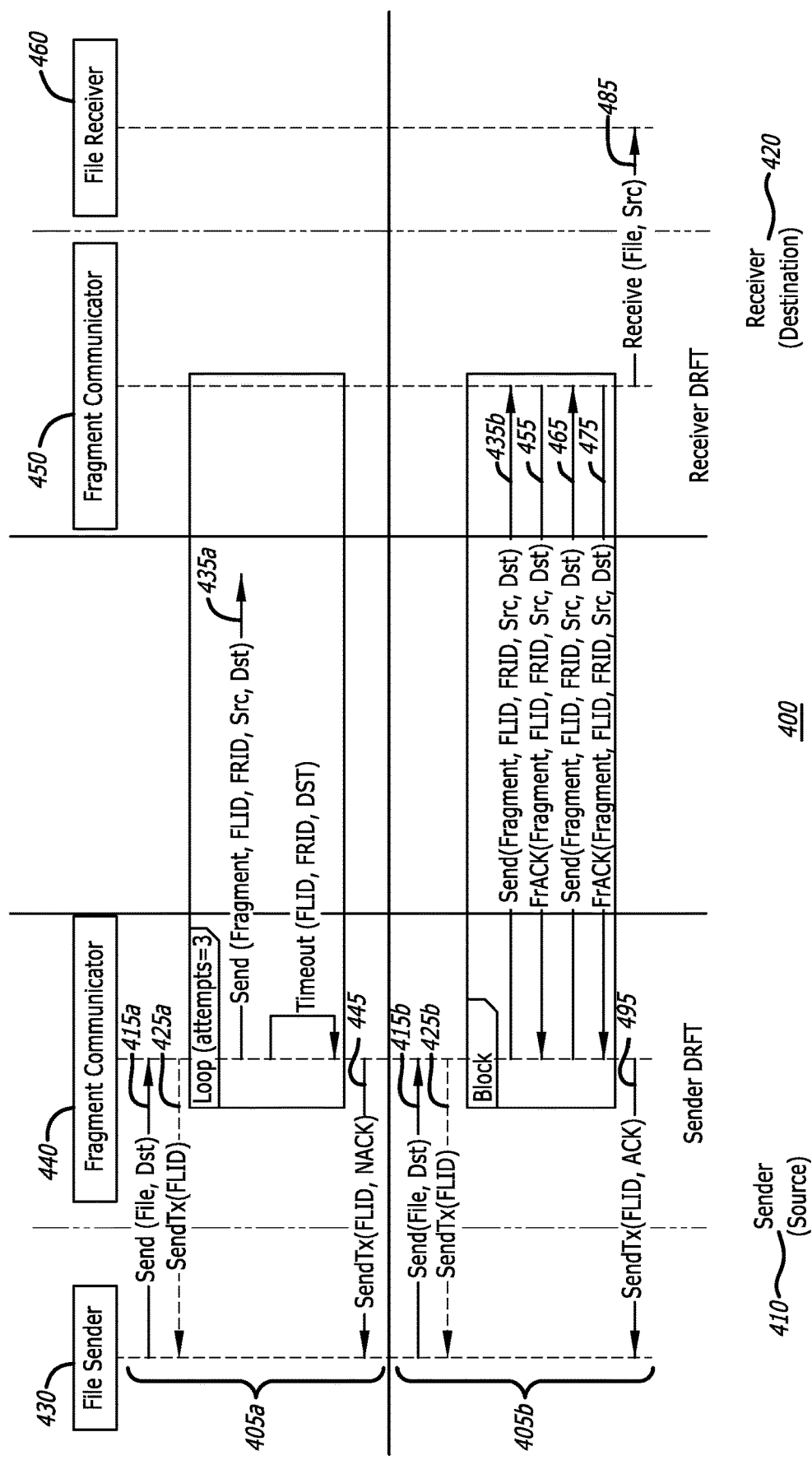
FIG. 4 is a diagram illustrating the high level interactions for the disclosed system for resilient file transfer for networked communication, in accordance with at least one embodiment of the present disclosure.

FIG. 4 is a diagram illustrating the high level interactions for the disclosed system 400 for resilient file transfer for networked communication, in accordance with at least one embodiment of the present disclosure. In this figure, two attempts 405a, 405b for sending a file from a sender (e.g., a source) 410 to a receiver (e.g., a destination) 420 are shown. Attempt 405a for sending a file is unsuccessful, and attempt 405b for sending a file is successful.

For the attempt 405a for sending a file, a file sender (e.g., a file sender unit or module) 430 of a sender (e.g., a source) 410 transmits (via wire or wirelessly) a first transmission signal 415a (comprising the file (File)) to a fragment communicator (e.g., a fragment communicator unit or module) 440 of the sender 410. The destination (Dst) of the file (File) is specified in the first transmission signal 415a. After the fragment communicator 440 receives the first transmission signal 415a from the file sender 430, the fragment communicator 440 transmits (via wire or wirelessly) a confirmation signal 425a to the file sender 430 indicating that the fragment communicator has received the first transmission signal 415a. The file identification number (FLID) is specified in the confirmation signal 425a to indicate which specific file was received.

Then, the fragment communicator 440 transmits (via wire or wirelessly) a second transmission signal 435a (comprising a fragment (Fragment) of the file) to the receiver 420. In one or more embodiments, the second transmission signal 435a (comprising the fragment (Fragment) of the file) is transmitted via the DR-FT layer (e.g., refer to 340 of FIG. 3) in the protocol stack. The file identification number (FLID), the fragment identification number (FRID), the source (Src), and the destination (Dst) are specified in the second transmission signal 435a. The fragment identification number (FRID) indicates which specific fragment of the file is being sent.

It should be noted that, if the receiver 420 receives the second transmission signal 435a, the receiver 420 will send an acknowledgment signal (FrACK) (e.g., refer to 455) to the sender 410 indicating receipt of the second transmission signal 435a. And, if the fragment communicator 440 of the sender 410 does not receive an acknowledgment signal (FrACK) from the receiver 420 within a predetermined timeout period, the fragment communicator 440 will resend the second transmission signal 435a (e.g., resend the fragment of the file) to the receiver 420.

For the example of attempt 405a, the fragment communicator 440 has not received an acknowledgment signal (FrACK) from the receiver 420 within the predetermined timeout period for each of three separate attempts of sending the second transmission signal 435a to the receiver 420. After the third attempt of sending the second transmission signal 435a to the receiver 420 and not receiving the acknowledgment signal (FrACK) from the receiver 420 within the predetermined timeout period, the fragment communicator 440 transmits a not acknowledge (NACK) signal 445 to the file sender 430 of the sender 410. The file identification number (FLID) is specified in the not acknowledge (NACK) signal 445 to indicate which specific file was not successfully transmitted to the receiver 420.

It should be noted that for the example of attempt 405a, the sender 410 of the system 400 is programmed to make three attempts to successfully send a fragment of a file to the receiver 420. However, in other embodiments, the sender 410 of the system 400 may be programmed to make more or less than three attempts to successfully send a fragment to the receiver 420, as is shown in FIG. 4.

For attempt 405b for sending a file, the file sender 430 of the sender 410 transmits (via wire or wirelessly) a first transmission signal 415b (comprising the file (File)) to the fragment communicator 440 of the sender 410. The destination (Dst) of the file (File) is specified in the first transmission signal 415b. After the fragment communicator 440 receives the first transmission signal 415b from the file sender 430, the fragment communicator 440 transmits (via wire or wirelessly) a confirmation signal 425a to the file sender 430 indicating that the fragment communicator has received the first transmission signal 415b. The file identification number (FLID) is specified in the confirmation signal 425b to indicate which specific file was received.

Then, the fragment communicator 440 transmits (via wire or wirelessly) a second transmission signal 435b (comprising a fragment (Fragment) of the file) to the receiver 420. In one or more embodiments, the second transmission signal 435b (comprising the fragment (Fragment) of the file) is transmitted via the DR-FT layer (e.g., refer to 340 of FIG. 3) in the protocol stack. The file identification number (FLID), the fragment identification number (FRID), the source (Src), and the destination (Dst) are specified in the second transmission signal 435b. The fragment identification number (FRID) indicates which specific fragment of the file is being sent.

After the second transmission signal 435b is sent, the fragment communicator (e.g., a fragment communicator unit or module) 450 of the receiver 420 receives the second transmission signal 435b. After the fragment communicator 450 of the receiver 420 receives the second transmission signal 435b, the fragment communicator 450 the receiver 420 transmits (via wire or wirelessly) an acknowledgment signal (FrACK) 455 to the sender 410 indicating receipt of the second transmission signal 435b. In one or more embodiments, the acknowledgment signal (FrACK) 455 is transmitted via the DR-FT layer (e.g., refer to 340 of FIG. 3) in the protocol stack. The file identification number (FLID), the fragment identification number (FRID), the source (Src), and the destination (Dst) are specified in the acknowledgment signal (FrACK) 455.

It should be noted that, if the fragment communicator 440 of the sender 410 receives an acknowledgment signal (FrACK) from the receiver 420 within a predetermined timeout period, the fragment communicator 440 will proceed to send the next fragment of the file to the receiver 420.

For the example of attempt 405b, the fragment communicator 440 has received an acknowledgment signal (FrACK) 455 from the receiver 420 within the predetermined timeout period. After the fragment communicator 440 has received the acknowledgment signal (FrACK) 455 from the receiver 420 within the predetermined timeout period, the fragment communicator 440 proceeds to transmit (via wire or wirelessly) a third transmission signal 465 (comprising the next fragment of the file) to the receiver 420. In one or more embodiments, the third transmission signal 465 (comprising the fragment (Fragment) of the file) is transmitted via the DR-FT layer (e.g., refer to 340 of FIG. 3) in the protocol stack.

After the fragment communicator 450 of the receiver 420 receives the third transmission signal 465, the fragment communicator 450 the receiver 420 transmits (via wire or wirelessly) an acknowledgment signal (FrACK) 475 to the sender 410 indicating receipt of the third transmission signal 465. In one or more embodiments, the acknowledgment signal (FrACK) 475 is transmitted via the DR-FT layer (e.g., refer to 340 of FIG. 3) in the protocol stack. The file identification number (FLID), the fragment identification number (FRID), the source (Src), and the destination (Dst) are specified in the acknowledgment signal (FrACK) 475.

In addition, after the fragment communicator 450 of the receiver 420 receives the third transmission signal 465, the fragment communicator 450 the receiver 420 determines that the entire file (comprising a total of two fragments) has been received. After the fragment communicator 450 determines that the entire file has been received, the fragment communicator 450 transmits (via wire or wirelessly) a fourth transmission signal (comprising the file (File)) 485 to the file receiver (e.g., a file receiver unit or module) 460 of the receiver 420. The source (Src) of the file (File) is specified in the fourth transmission signal 485.

For the example of attempt 405b, the fragment communicator 440 has received an acknowledgment signal (FrACK) 475 from the receiver 420 within the predetermined timeout period. After the fragment communicator 440 has receives the acknowledgment signal (FrACK) 475 from the receiver 420 within the predetermined timeout period, the fragment communicator 440 determines that the entire file has been received by the receiver 420. After the fragment communicator 440 determines that the entire file has been received by the receiver 420, the fragment communicator 440 transmits (via wire or wirelessly) an acknowledgement (ACK) signal 495 to the file sender 430 of the sender 410 indicating that the file has been successfully sent to the receiver 420. The file identification number (FRID) is specified in the acknowledgement (ACK) signal 495 to indicate which file was successfully transmitted to the receiver 420.

FIG. 5 is a diagram illustrating the determination of the round trip time (RTT) for the disclosed system for resilient file transfer for networked communication, in accordance with at least one embodiment of the present disclosure. In one or more embodiments, the round trip time is used to determine the timeout period for the transmission of a file fragment from the sender (source) to a receiver (destination).

In this figure, at time $t_1$, the sender (e.g., source) 510 transmits a data signal (e.g., comprising a fragment of a file) to a receiver (e.g., destination) 520. After the receiver 520 receives the data signal, the receiver 520 transmits an acknowledgement (Ack) signal to the sender 510 indicating successful receipt of the data signal. The sender 510 receives the acknowledgement (Ack) signal at time $t_2$. The round trip time measurement b is equal to $t_2$ minus $t_1$ (i.e. $\delta=t_2-t_1$).

In one or more embodiments, an exemplary algorithm for fragment timeout estimation is as follows.

For the determination of a timeout period, a current delay estimation is first calculated to be:

$$\delta_e^{n+1} = (\alpha * \delta_e^n) + (\beta * \delta),$$

where $\delta_e^{n+1}$ is the current delay estimation,
$\delta_e^n$ is the previous delay estimation,
$\delta$ is the current delay measurement (i.e. $\delta=t_2-t_1$) (refer to FIG. 5),
$\alpha$ (e.g., is equal to 0.8) determines the weightage of the previous delay estimation for the current delay estimation,
$\beta$ (e.g., is equal to 0.2) determines the weightage of the current delay measurement for the current delay estimation, and
where $\alpha+\beta=1$.

For example, when $\alpha=1$ and $\beta=0$, the delay is constant and the delay measurements are ignored for the determination. And, for example, when $\alpha=0$ and $\beta=1$, the delay is determined to be the last seen measurement and the previous measurements are ignored for the determination.

After the current delay estimation is calculated, the timeout period is determined to be equal to the current delay estimation ($\delta_e^{n+1}$) multiplied by a variable gamma (e.g., which may be equal to 2), which is:

$$\text{timeout period} = (\delta_e^{n+1}) * \gamma$$

Whenever a fragment is sent from a sender to a receiver and an acknowledgement signal is not received by the sender within the timeout period for receipt by the receiver of that fragment, a timeout (or timeout period) is said to have occurred.

When a timeout (or timeout period) has occurred, (1) the current delay estimation ($\delta_e^{n+1}$) is recalculated, (2) the recalculated current delay estimation ($\delta_e^{n+1}$) is ensured to be less than or equal to a maximum delay (e.g., a ceiling value), and (3) the fragment is retransmitted from the sender to the receiver.

For the recalculation of the current delay estimation ($\delta_e^{n+1}$), the current delay measurement ($\delta$) is set to equal gamma times the previous delay estimation (i.e. $\delta=\gamma*\delta_e^n$). Then, the current delay estimation ($\delta_e^{n+1}$) is recalculated (i.e. $\delta_e^{n+1}=(\alpha*\delta_e^n)+(\beta*\delta)$) using the new value for the current delay measurement ($\delta$).

For ensuring that the recalculated current delay estimation ($\delta_e^{n+1}$) is less than or equal to a maximum delay, the maximum delay ($\delta_{max}$) is calculated to be equal to an initial delay estimation (measureInit) multiplied by a maximum policy value (maxPolicy). Then, if the current delay estimation ($\delta_e^{n+1}$) is determined to be greater than the maximum delay ($\delta_{max}$), the current delay estimation ($\delta_e^{n+1}$) is set to be equal to the maximum delay ($\delta_{max}$).

FIG. 6 is a diagram showing exemplary algorithm pseudocode 600 for the disclosed method for resilient file transfer for networked communication, in accordance with at least one embodiment of the present disclosure. In particular, the exemplary algorithm pseudocode is for determining whether a timeout period has occurred after attempting to send a fragment of a file from the source to a destination. In one or more embodiments, the algorithm (e.g., algorithm pseudocode) may be run on at least one processor (e.g., refer to 907 of FIG. 9), which may be associated with (e.g., located within) the source (e.g., sender), associated with (e.g., located within) the destination (e.g., receiver), and/or located at a location remote from the source and the destination.

The algorithm pseudocode 600 is shown to comprise four subroutines, which are the initialize subroutine 610, the update forecast subroutine 620, the record timeout subroutine 630, and the is timeout subroutine 640. For the initialize subroutine 610, the variables are as follows: delta_e is the previous delay estimation ($\delta_e^n$), measureInit is an initial delay estimation, maxPolicy is a maximum policy value, alpha is the weightage of the previous delay estimation for the current delay estimation ($\alpha$), beta is the weightage of the current delay measurement for the current delay estimation ($\beta$), and gamma is a variable ($\gamma$).

For the update forecast subroutine 620, delta_e (i.e. the current delay estimation ($\delta_e^{n+1}$)) is calculated using the variables contained within the initialize subroutine 610 as well as the variable measure, which is current delay measurement (i.e. $\delta=t_2-t_1$).

The record timeout subroutine 630 is used to determine whether a recalculated current delay estimation ($\delta_e^{n+1}$) is greater than a maximum delay ($\delta_{max}$). For this subroutine 630, the variable deltaTemp is a temporary delay estimation. The temporary delay estimation is calculated using the variables contained within the initialize subroutine 610.

For the timeout subroutine 640, it is determined whether a timeout period has occurred. The subroutine 640 utilizes the variables contained within the initialize subroutine 610 as well as the variable currentTime (which is the time $t_2$, as shown in FIG. 5) and the variable sendTime (which is the time $t_1$, as shown in FIG. 5). If a timeout period has occurred (TRUE) (e.g., the sender received an acknowledgment from the receiver indicating receipt of the fragment within the timeout period) or has not occurred (FALSE) (e.g., the sender has not received an acknowledgement from the receiver indicating receipt of the fragment within the timeout period).

For additional understanding of the operation of the algorithm pseudocode, a timeout determination algorithm example follows.

Initialization:
Let alpha=0.8, beta=0.2, and gamma=2
Let measureInit=20 seconds, and delta_e=20
Sequence of Events:
Event 1: ACK for fragment 1 arrives 10 seconds after sending the fragment $$\text{Delta\_e} = (20 * 0.8) + (10 * 0.2) = 18$$

Event 2: ACK for fragment 2 arrives 14 seconds after sending the fragment $$\text{Delta\_e} = (18*0.8) + (14*0.2) = 17.2$$

Event 3: ACK for fragment 3 arrives at 15 seconds after sending the fragment $$\text{Delta\_e} = (17.2*0.8) + (15*0.2) = 16.76$$

Event 4: ACK for fragment 4 times out (i.e. does not arrive within 16.76*2=33.52 seconds).

Delta_e is recalculated:

$$\text{Delta\_e} = ((0.8*16.76) + (0.2*33.52) = 20.112$$

FIGS. 7A, 7B, and 7C together are a flow chart showing the disclosed method for resilient file transfer for networked communication, in accordance with at least one embodiment of the present disclosure. At the start 705 of the method, a source (e.g., a sender) transmits a fragment of a file (e.g., a first fragment of a file) to a destination (e.g., a receiver) 710. Then, the destination transmits an acknowledgement to the source, when the destination receives the fragment 715.

An initial current delay estimation ($\delta_e^{n+1}$) is then determined. For this determination, at least one processor calculates a current delay measurement ($\delta$), which is a difference of a time the fragment is transmitted from the source and a time the acknowledgement is received by the source, when the source receives the acknowledgement 720. Then, at least one processor (e.g., refer to 907 of FIG. 9) calculates the current delay estimation ($\delta_e^{n+1}$), which is a sum of a previous delay estimation ($\delta_e^n$) weighted by a variable alpha ($\alpha$) and the current delay measurement ($\delta$) weighted by a variable beta ($\beta$), when the source receives the acknowledgement 725.

After the initial current delay estimation ($\delta_e^{n+1}$) is determined, a subsequent fragment is transmitted. Specifically, the source transmits a subsequent fragment (e.g., a secondary fragment of the file) to the destination 730. At least one processor then calculates a time difference ($\Delta T$), which is equal to a difference of a time the subsequent fragment is transmitted from the source and a current time 735. Then, at least one processor determines whether the subsequent fragment transmitted (e.g., the secondary fragment of the file) should be retransmitted by the source to the destination by using the current delay estimation ($\delta_e^{n+1}$) (e.g., in particular, by determining whether a timeout period has occurred, which is when the time difference ($\Delta T$) is greater than the current delay estimation ($\delta_e^{n+1}$) multiplied by a variable gamma ($\gamma$)) 740. The source retransmits the subsequent fragment to the destination, when the timeout period has occurred (i.e. when the time difference ($\Delta T$) is greater than the current delay estimation ($\delta_e^{n+1}$) multiplied by a variable gamma ($\gamma$)) 745.

After the timeout period has occurred, the current delay estimation ($\delta_e^{n+1}$) is then recalculated. In particular, at least one processor recalculates the current delay estimation ($\delta_e^{n+1}$) using the current delay measurement ($\delta$) equal to the current delay estimation ($\delta_e^{n+1}$) multiplied by the variable gamma ($\gamma$), when the timeout period has occurred (i.e. when the time difference ($\Delta T$) is greater than the current delay estimation ($\delta_e^{n+1}$) multiplied by the variable gamma ($\gamma$)) 755.

Additionally, after the timeout period has occurred, the recalculated current delay estimation ($\delta_e^{n+1}$) is ensured to be less than or equal to a maximum delay ($\delta_{max}$). In particular, at least one processor calculates the maximum delay ($\delta_{max}$), which is equal to an initial delay estimation multiplied by a maximum policy value 760. Then, at least one processor sets the current delay estimation ($\delta_e^{n+1}$) to equal the maximum delay ($\delta_{max}$), when the current delay estimation ($\delta_e^{n+1}$) is greater than the maximum delay ($\delta_{max}$) 765. Then, the method ends 770.

FIG. 8 is a sequence diagram 800 of the component interactions when a file is sent for the disclosed method for resilient file transfer for networked communication, in accordance with at least one embodiment of the present disclosure. In particular, the sequence diagram 800 comprises the plurality of interactions (e.g., running of applications) that occurs at the sender (source) (e.g., refer to 410 of FIG. 4) prior to (and during) the sender transmitting fragments of a file to a receiver (destination) (e.g., refer to 420 of FIG. 4). In one or more embodiments, at least one processor associated with (e.g., located at) the sender performs the interactions in the sequence diagram 800 by running the applications.

In FIG. 8, the sequence diagram 800 is shown to comprise a plurality of columns, where each column represents an application type. In particular, the columns comprise a user application column 801, a PKDN application column 802, DR-FT File Manager application columns 803, 804, and a DTN application column 805. It should be noted that the applications (of the various different application types in the sequence diagram 800) run on their corresponding protocol layers (e.g., refer to FIG. 3). For example, a user application runs on the user application layer 310 of the protocol stack 300, a PKDN application runs on the PKDN layer 330 of the protocol stack 300, a DR-FT application runs on the DR-FT layer 340 of the protocol stack 300, and a DTN application runs on the DTN layer 350 of the protocol stack 300.

At the start 810 of the sequence of the sequence diagram 800, a file (which is designated to be sent from the source to the destination) is located in the user application column 801 to indicate that the file is a user application file. Then, the sequence proceeds to transfer the file to the DR-FT File Manager application column 803, where the file to be sent is identified 815. The file comprises data, such as the file identification (id), the source of the file (src), the destination of the file (dst), and the file metadata (f[*]).

At least one processor then determines whether a security certificate exists for the destination (dst) (which is also referred to as node 2 (n2)) (i.e. whether the source possesses the destination's security certificate) 820. If the processor determines that a security certificate does exist for the destination, at least one processor will then (1) encrypt the file using a random key, where the random key is encrypted with the destination's public key using symmetric encryption, and (2) sign the encrypted file with the source's (which is also referred to as node 1 (n1)) private key 825. Then, the sequence may proceed (via two-way splitter block 830) back to the user application column 801 where the signed encrypted file is recorded 835. After the file is recorded, the file comprises data, such as the source of the file (src), the destination of the file (dst), a time stamp of the recordation (ts), an arbitrary number (nonce), and hashed file metadata (hash(f[*])). Then, the sequence ends 836.

However, if the If processor determines that a security certificate does not exist for the destination, the sequence will proceed to the PKDN application column 802 where the security certificates are exchanged 840. For the exchanging of the security certificates, the source will obtain the destination's security certificate from the destination, and the destination will obtain the source's security certificate from the source. After the security certificates are exchanged, the file is encrypted 845. For this encryption, the file is encrypted one time using an identity-based encryption for the destination, and the source's security certificate is appended to the encrypted file. After the file is encrypted, the sequence will proceed back to the DR-FT File Manager application column 803 where the encrypted file is then signed using the source's private key 850.

In addition, in the PKDN application column 802, an encrypted file (which is designated to be sent from the source to the destination) is located in the PKDN application column 802 to indicate that the file is a PKDN application file 885. Then, the sequence proceeds to the DR-FT File Manager application column 803 where the encrypted file is then signed using the source's private key 850.

After the encrypted file is signed at step 850, the sequence may proceed (via two-way splitter block 855) to determine whether the application identification (appid) of the signed encrypted file is equal to the PKDN application (i.e. whether the application identification corresponds to the PKDN application, thereby indicating that the file is a PKDN application) 860. If at least one processor determines that the application identification is equal to the PKDN application, the sequence proceeds to the PKDN application column 802 where the signed encrypted file is recorded 865. After the file is recorded, the file comprises data, such as the source of the file (src), the destination of the file (dst), a time stamp of the recordation (ts), an arbitrary number (nonce), and hashed file metadata (hash(f[*])). Then, the sequence ends 866.

However, if at least one processor determines that the application identification is not equal to the PKDN application, the sequence proceeds to the user application column 801 where the signed encrypted file is recorded 835. After the file is recorded, the file comprises data, such as the source of the file (src), the destination of the file (dst), a time stamp of the recordation (ts), an arbitrary number (nonce), and hashed file metadata (hash(f[*])). Then, the sequence ends 836.

Conversely, after the file is signed and encrypted at step 825 or after the encrypted file is signed at step 850, the sequence may proceed (via two-way splitter block 830 or two-way splitter block 855) to send the file 870. Then, the sequence proceeds to the DR-FT fragment management application column 804 where the signed encrypted file is stripped into multiple fragments 875. After the signed encrypted file is stripped into multiple fragments, the sequence proceeds to the DTN application column 805 where the fragments of the file are transmitted from the source to go to the destination 880. Then, the sequence ends 881.

FIG. 9 illustrates a block diagram of an illustrative computing system 900 suitable for implementing an embodiment of the present disclosure, in accordance with at least one embodiment of the present disclosure. For example, at least one vehicle and/or stationary entity (e.g., operating as a sender (source) and/or a receiver (destination)) of the disclosed system (e.g., the system 100 of FIG. 1) may include and/or employ at least a portion (e.g., processor(s) 907) of the disclosed computer system 900. Computing system 900 includes a bus 906 or other communication mechanism for communicating information, which interconnects subsystems and devices, such as processor(s) 907, system memory 908 (e.g., random access memory (RAM)), static storage device 909 (e.g., read only memory (ROM)), disk drive 910 (e.g., magnetic or optical), communication interface 914 (e.g., modem or Ethernet card), display 911 (e.g., cathode ray tube (CRT) or liquid crystal display (LCD)), input device 912 (e.g., keyboard), and cursor control (not shown).

According to one embodiment of the present disclosure, computer system 900 performs specific operations by processor(s) 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the present disclosure. Thus, embodiments of the present disclosure are not limited to any specific combination of hardware circuitry and/or software. In one embodiment, the term "logic" shall mean any combination of software or hardware that is used to implement all or part of the present disclosure.

The term "computer readable medium" or "computer usable medium" as used herein refers to any medium that participates in providing instructions to processor(s) 907 for execution. Such a medium may take many forms, including but not limited to, non-volatile media, volatile media, and transmission media. Non-volatile media includes, for example, optical or magnetic disks, such as disk drive 910. Volatile media includes dynamic memory, such as system memory 908.

Common forms of computer readable media include, for example, floppy disk, flexible disk, hard disk, magnetic tape, any other magnetic medium, compact disc-read only memory (CD-ROM), any other optical medium, punch cards, paper tape, any other physical medium with patterns of holes, RAM, programmable read only memory (PROM), erasable programmable read only memory (EPROM), FLASH-EPROM, any other memory chip or cartridge, or any other medium from which a computer can read.

In an embodiment of the present disclosure, execution of the sequences of instructions to practice the present disclosure is performed by a single computer system 900. According to other embodiments of the present disclosure, two or more computer systems 900 coupled by communication link 915 (e.g., local area network (LAN), public switched telephone network (PTSN), or wireless network) may perform the sequence of instructions required to practice the present disclosure in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. Computer system 900 may also interact with a database 932 within a database system 931 via a data interface 933 where the computer system 900 may store and retrieve information or data of the electronic design into and from the database system 931.

As previously mentioned above, in one or more embodiments, a method for resilient file transfer (ResiFT) comprises identifying, by at least one processor associated with a source, a file to be transmitted from the source to a destination. The method further comprises determining, by at least one processor running a delay-tolerant and reliable file transfer (DR-FT) application, whether the source has a security certificate for the destination. Also, the method comprises obtaining, by at least one processor running a public key distribution network (PKDN) application, the security certificate for the destination from the destination, when at least one processor determines that the source does not have the security certificate for the destination. In addition, the method comprises encrypting and signing, by at least one processor, the file to generate a signed encrypted file. Additionally, the method comprises stripping, by at least one processor running another DR-FT application, the signed encrypted file to generate a plurality of fragments. Further, the method comprises transmitting, by at least one processor running a delay tolerant networking (DTN) application, the fragments from the source to the destination.

In at least one embodiment, the method further comprising running the DR-FT applications on a DR-FT layer in a protocol stack. In one or more embodiments, a ResiFT layer in the protocol stack comprises the DR-FT layer. In at least one embodiment, an application layer is located on top of the ResiFT layer in the protocol stack. In one or more embodiments, the DR-FT layer is located adjacent a delay tolerant networking (DTN) layer in the protocol stack.

In one or more embodiments, the method further comprises running the PKDN application on a PKDN layer in a protocol stack. In at least one embodiment, a ResiFT layer in the protocol stack comprises the PKDN layer.

In at least one embodiment, the method further comprises running the DTN application on a DTN layer in a protocol stack. In one or more embodiments, a bundle protocol layer in the protocol stack comprises the DTN layer. In at least one embodiment, the bundle protocol layer further comprises a duplex opportunistic point-to-point DTN convergence layer (DOP-CL) and a half-duplex opportunistic point-to-point DTN convergence layer (HOP-CL). In one or more embodiments, the bundle protocol layer is located on top of a transport layer in the protocol stack. In at least one embodiment, the transport layer is located on top of a network layer in the protocol stack. In one or more embodiments, a ResiFT layer is located on top of the DTN layer in the protocol stack.

In one or more embodiments, a system for resilient file transfer (ResiFT) comprises a source configured to transmit fragments of a file to a destination. The system further comprises at least one processor associated with the source configured to: identify the file to be transmitted from the source to a destination; determine, by running a delay-tolerant and reliable file transfer (DR-FT) application, whether the source has a security certificate for the destination; obtain, by running a public key distribution network (PKDN) application, the security certificate for the destination from the destination, when the source does not have the security certificate for the destination; encrypt and sign the file to generate a signed encrypted file; strip, by running another DR-FT application, the signed encrypted file to generate the fragments; and transmit, by running a delay tolerant networking (DTN) application, the fragments from the source to the destination. The system further comprises the destination configured to receive the fragments of the file from the source.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A method for resilient file transfer, the method comprising:
   transmitting, by a source, a fragment of a file to a destination;
   receiving, by the source, an acknowledgement to the source, when the destination receives the fragment;
   calculating, by at least one processor associated with the source, a current delay measurement ($\delta$), which is a difference of a time the fragment is transmitted from the source and a time the acknowledgement is received by the source, when the source receives the acknowledgement;
   calculating, by the at least one processor, a current delay estimation ($\delta_{en+1}$), which is a sum of a previous delay estimation ($\delta_{en}$) weighted by a variable alpha ($\alpha$) and the current delay measurement ($\delta$) weighted by a variable beta ($\beta$), when the source receives the acknowledgement;
   transmitting, by the source, a subsequent fragment to the destination; and
   setting, by the at least one processor, the current delay measurement ($\delta$) to equal the current delay estimation ($\delta_{en+1}$) multiplied by a variable gamma ($\gamma$), when a time difference ($\Delta T$), which is equal to a difference of a time the subsequent fragment is transmitted by the source and a current time, is greater than the current delay estimation ($\delta_{en+1}$) multiplied by the variable gamma ($\gamma$).

2. The method of claim 1, wherein the method further comprises:
   calculating, by the at least one processor, a time difference ($\Delta T$), which is equal to a difference of a time the subsequent fragment is transmitted by the source and a current time; and
   retransmitting, by the source, the subsequent fragment to the destination, when the time difference ($\Delta T$) is greater than the current delay estimation ($\delta_{en+1}$) multiplied by a variable gamma ($\gamma$).

3. The method of claim 2, wherein the method further comprises:
   recalculating, by the at least one processor, the current delay estimation ($\delta_{en+1}$) using the current delay measurement ($\delta$) equal to the current delay estimation ($\delta_{en+1}$) multiplied by the variable gamma ($\gamma$), when the time difference ($\Delta T$) is greater than the current delay estimation ($\delta_{en+1}$) multiplied by the variable gamma ($\gamma$).

4. The method of claim 3, wherein the method further comprises:
   calculating, by the at least one processor, a maximum delay ($\delta max$), which is equal to an initial delay estimation multiplied by a maximum policy value; and
   setting, by the at least one processor, the current delay estimation ($\delta_{en+1}$) to equal the maximum delay ($\delta max$), when the current delay estimation ($\delta_{en+1}$) is greater than the maximum delay ($\delta max$).

5. The method of claim 1, wherein a sum of the variable alpha ($\alpha$) and the variable beta ($\beta$) is equal to one (1).

6. The method of claim 1, wherein the at least one processor is located at the source or remote from the source.

7. The method of claim 1, wherein a source fragment communicator of the source transmits the fragment.

8. The method of claim 1, wherein the method further comprises: receiving, by the destination, the fragment.

9. The method of claim 8, wherein a destination fragment communicator of the destination receives the fragment.

10. The method of claim 1, wherein a vehicle or a terrestrial node comprises the source.

11. The method of claim 10, wherein the vehicle is one of an airborne vehicle, a marine vehicle, a terrestrial vehicle, or a space vehicle.

12. The method of claim 10, wherein the vehicle is an autonomous vehicle.

13. The method of claim 1, wherein a vehicle or a terrestrial node comprises the destination.

14. The method of claim 13, wherein the vehicle is one of an airborne vehicle, a marine vehicle, a terrestrial vehicle, or a space vehicle.

15. The method of claim 13, wherein the vehicle is an autonomous vehicle.

16. The method of claim 1, wherein the fragment is transmitted by the source to the destination via a delay-tolerant and reliable file transfer (DR-FT) layer in a protocol stack.

17. The method of claim 16, wherein the DR-FT layer is adjacent to a delay tolerant networking (DTN) layer in the protocol stack.

18. The method of claim 1, wherein the acknowledgement is transmitted by the destination to the source via a delay-tolerant and reliable file transfer (DR-FT) layer in a protocol stack.

19. A system for resilient file transfer, the system comprising:
   a source configured to transmit a fragment of a file to a destination;
   the destination configured to transmit an acknowledgement to the source, when the destination receives the fragment; and
   at least one processor configured to:
     calculate a current delay measurement ($\delta$), which is a difference of a time the fragment is transmitted from the source and a time the acknowledgement is received by the source, when the source receives the acknowledgement;
     calculate a current delay estimation ($\delta_{en+1}$), which is a sum of a previous delay estimation ($\delta_{en}$) weighted by a variable alpha ($\alpha$) and the current delay measurement ($\delta$) weighted by a variable beta ($\beta$), when the source receives the acknowledgement;
     determine whether a subsequent fragment transmitted should be retransmitted by the source to the destination by using the current delay estimation ($\delta_{en+1}$); and
     set the current delay measurement ($\delta$) to equal the current delay estimation ($\delta_{en+1}$) multiplied by a variable gamma ($\gamma$), when a time difference ($\Delta T$), which is equal to a difference of a time the subsequent fragment is transmitted by the source and a current time, is greater than the current delay estimation ($\delta_{en+1}$) multiplied by the variable gamma ($\gamma$).

20. A method for resilient file transfer (ResiFT), the method comprising:
   identifying, by at least one processor associated with a source, a file to be transmitted from the source to a destination;
   determining, by the at least one processor running a delay-tolerant and reliable file transfer (DR-FT) application, whether the source has a security certificate for the destination;
   obtaining, by the at least one processor running a public key distribution network (PKDN) application, the security certificate for the destination from the destination, when the at least one processor determines that the source does not have the security certificate for the destination;
   encrypting and signing, by the at least one processor, the file to generate a signed encrypted file;
   stripping, by the at least one processor running another DR-FT application, the signed encrypted file to generate a plurality of fragments; and
   transmitting, by the at least one processor running a delay tolerant networking (DTN) application, the fragments from the source to the destination by using the method of claim 1.

* * * * *